(12) United States Patent
Auger

(10) Patent No.: US 9,323,906 B2
(45) Date of Patent: Apr. 26, 2016

(54) METHOD AND SYSTEM FOR DIGITAL RIGHTS MANAGEMENT ENFORCEMENT

(71) Applicant: D2L CORPORATION, Kitchener (CA)

(72) Inventor: Jeremy Auger, Kitchener (CA)

(73) Assignee: D2L CORPORATION, Kitchener, ON (CA)

( * ) Notice: Subject to any disclaimer, the term of this patent is extended or adjusted under 35 U.S.C. 154(b) by 76 days.

(21) Appl. No.: 14/017,871

(22) Filed: Sep. 4, 2013

(65) Prior Publication Data

US 2015/0067891 A1 Mar. 5, 2015

(51) Int. Cl.
*G06F 21/10* (2013.01)
*G06F 7/04* (2006.01)

(52) U.S. Cl.
CPC .............. *G06F 21/105* (2013.01); *G06F 21/10* (2013.01)

(58) Field of Classification Search
CPC ....... G06F 21/10; G06F 21/105; G06F 21/60; G06F 21/604; G06F 21/62; G06F 21/6209
See application file for complete search history.

(56) References Cited

U.S. PATENT DOCUMENTS

| | | | |
|---|---|---|---|
| 5,845,281 A * | 12/1998 | Benson et al. | |
| 6,885,748 B1 * | 4/2005 | Wang | 380/201 |
| 2002/0146675 A1 * | 10/2002 | Koga | G09B 7/00 434/350 |
| 2004/0230825 A1 * | 11/2004 | Shepherd et al. | 713/200 |
| 2006/0059561 A1 * | 3/2006 | Ronning et al. | 726/26 |
| 2007/0022181 A1 * | 1/2007 | Matsuo | 709/217 |
| 2007/0156897 A1 * | 7/2007 | Lim | 709/225 |
| 2008/0127304 A1 * | 5/2008 | Ginter et al. | 726/2 |
| 2008/0256482 A1 * | 10/2008 | Lee et al. | 715/781 |
| 2009/0158439 A1 * | 6/2009 | Lee et al. | 726/26 |
| 2010/0100561 A1 * | 4/2010 | Cooper | G06Q 10/067 707/769 |
| 2010/0107258 A1 * | 4/2010 | Park et al. | 726/26 |
| 2011/0010210 A1 * | 1/2011 | Alcorn | G06F 17/30997 705/326 |

* cited by examiner

*Primary Examiner* — Darren B Schwartz
(74) *Attorney, Agent, or Firm* — Gowling WLG (Canada) LLP; Neil Henderson

(57) ABSTRACT

A method and system for Digital Right Management (DRM) enforcement on a client device is provided. The method includes: determining client requested digital content; retrieving DRM data associated with the requested digital content; bundling the associated DRM with the requested digital content; transmitting the bundled DRM and digital content to the client device; and enforcing the DRM on the client device. The system includes: a client device configured to issue a request for digital content; a content review module configured to retrieve DRM data associated with the requested digital content; a bundler module configured to bundle the associated DRM with the requested digital content; a connection module configured to transmit the bundled DRM and digital content to the client device; and an enforcement module configured to enforce the DRM on the client device.

19 Claims, 4 Drawing Sheets

METHOD AND SYSTEM FOR DIGITAL RIGHTS MANAGEMENT ENFORCEMENT

FIELD

The present disclosure relates generally to digital rights management. More particularly, the present disclosure relates to embodiments of a method and system for digital rights management enforcement.

BACKGROUND

Digital Rights Management (DRM) is a class of access control technologies that are used with the intent to limit the use of digital content after the sale or distribution of the digital content. DRM describes any technology that inhibits the use of digital content in a manner not intended by the content provider.

According to the related art, on the purchase of digital content, DRM is associated with the digital content. For example, a compact disc or Blu-ray™ disc may have a region code associated with the content which only allows players associated with that region code to play the disc. Only on manipulation of the digital content is the user aware that the rights are limited. Issues can occur when digital content is purchased via an online purchase with which the content is downloaded and DRM limits the use of the digital content through online control via a server or other content distributor. If a user limits the user's online presence, the DRM may not be enforced and the user may be able to access the content in a manner that is unintended.

It is, therefore, desirable to provide a method and system for digital rights management enforcement that mitigates at least one disadvantage of previous systems.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for enforcing Digital Right Management (DRM) using a client device, the method including: determining client requested digital content; retrieving DRM data associated with the requested digital content; bundling the associated DRM with the requested digital content; transmitting the bundled DRM and digital content to the client device; and enforcing the DRM on the client device.

In a particular case, the method may further include storing the requested digital content and DRM on the client device; accessing the digital content on the client device; retrieving the associated DRM stored locally on the client device; and limiting use of the digital content as restricted by the DRM.

In another particular case, the method may include informing a user of the DRM associated with the requested digital content.

In yet another particular case, the method may include disabling access to the requested digital content as defined in the associated DRM. In another case the method may include deleting the requested digital content as defined in the associated DRM.

In a particular case, the retrieving of the DRM may include querying a learning management system.

In another particular case, the determining of the client requested digital content may further includes determining user data related to a user requesting the digital content.

In yet another particular case, the retrieving of the DRM may include retrieving DRM related to the user data. In some cases, the user data may include at least one of user identification data, user membership data, user role, and user's intended use of the data.

In a particular case the enforcing of the DRM on the client device may comprise determining whether the client device has appropriate rights for performing a requested operation in relation to the digital content based on DRM stored on the client device.

In another particular case, the determining of whether the client device has the appropriate rights for performing the requested operation in relation to the digital content may be performed using information stored locally on the client device.

In yet another particular case, the determining of whether the client device has the appropriate rights for performing the requested operation in relation to the content may be performed without requiring further information relating to digital rights associated with the content to be transmitted to the client device.

In further aspect, the present disclosure provides a system for enforcing Digital Right Management (DRM) on a client device, the system including: the client device configured to issue a request for digital content; a content review module configured to retrieve DRM data associated with the requested digital content; a bundler module configured to bundle the associated DRM with the requested digital content; a connection module configured to transmit the bundled DRM and digital content to the client device; and an enforcement module configured to enforce the DRM on the client device.

In a particular case, the system may further include: a memory module configured to store the requested digital content and DRM on the client device; an input component configured to allow a user to access the digital content on the client device; and the enforcement module further configured to retrieve the associated DRM stored locally on the client device and limit the use of the digital content as restricted by the DRM.

In another particular case, the content review module may be further configured to retrieve the DRM by querying a learning management system.

In yet another particular case, the content review module may be further configured to determine user data related to a user requesting the digital content.

In still yet another particular case, the content review module may be further configured to retrieve DRM related to the user data.

In a particular case, the user data may include at least one of user identification data, user membership data, user role, and user's intended use of the data.

In another particular case, the enforcement module may be further configured to determine whether the client device has appropriate rights for performing a requested operation in relation to the digital content based on DRM stored on the client device.

In yet another particular case, the enforcement module may be further configured to determine whether the client device has the appropriate rights for performing the requested operation in relation to the digital content is performed using information stored locally on the client device.

In still yet another particular case, the enforcement module may be further configured to determine whether the client device has the appropriate rights for performing the requested operation in relation to the content is performed without requiring further information relating to digital rights associated with the content to be transmitted to the client device.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

Throughout the drawings, like reference numerals will be understood to refer to like parts, components, and structures.

DETAILED DESCRIPTION

The following description with reference to the accompanying drawings is provided to assist in a comprehensive understanding of example embodiments of the system and method as defined by the claims and their equivalents. The following description includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the embodiments of the method and system described herein. Accordingly, it should be apparent to those skilled in the art that the following description of example embodiments is provided for illustration purpose only and not for the purpose of limiting the invention as defined by the appended claims and their equivalents.

Generally, the present disclosure provides embodiments for a method and system for Digital Rights Management (DRM) enforcement. In particular, the embodiments of the system and method detailed herein provide for DRM to be retrieved from a plurality of sources and bundled with the related digital content. The digital content bundled with the DRM is transmitted to a client device and the DRM are enforced by the client device.

Control over digital content is increasingly important as individuals accept and adapt to new forms of media. Individuals are able to access digital content or copyright content through a variety of computing devices, for example, electronic books or readers, tablet computers, smart phones, laptops, and the like. Individuals may further limit or block the computing devices network connection in an attempt reduce data costs or in an attempt to circumvent DRM. As such, the embodiments of the systems and methods detailed herein are intended to allow the enforcement of DRM without requiring the computing device to access a network to enforce the DRM (e.g., the digital rights associated therewith).

Figure 1:
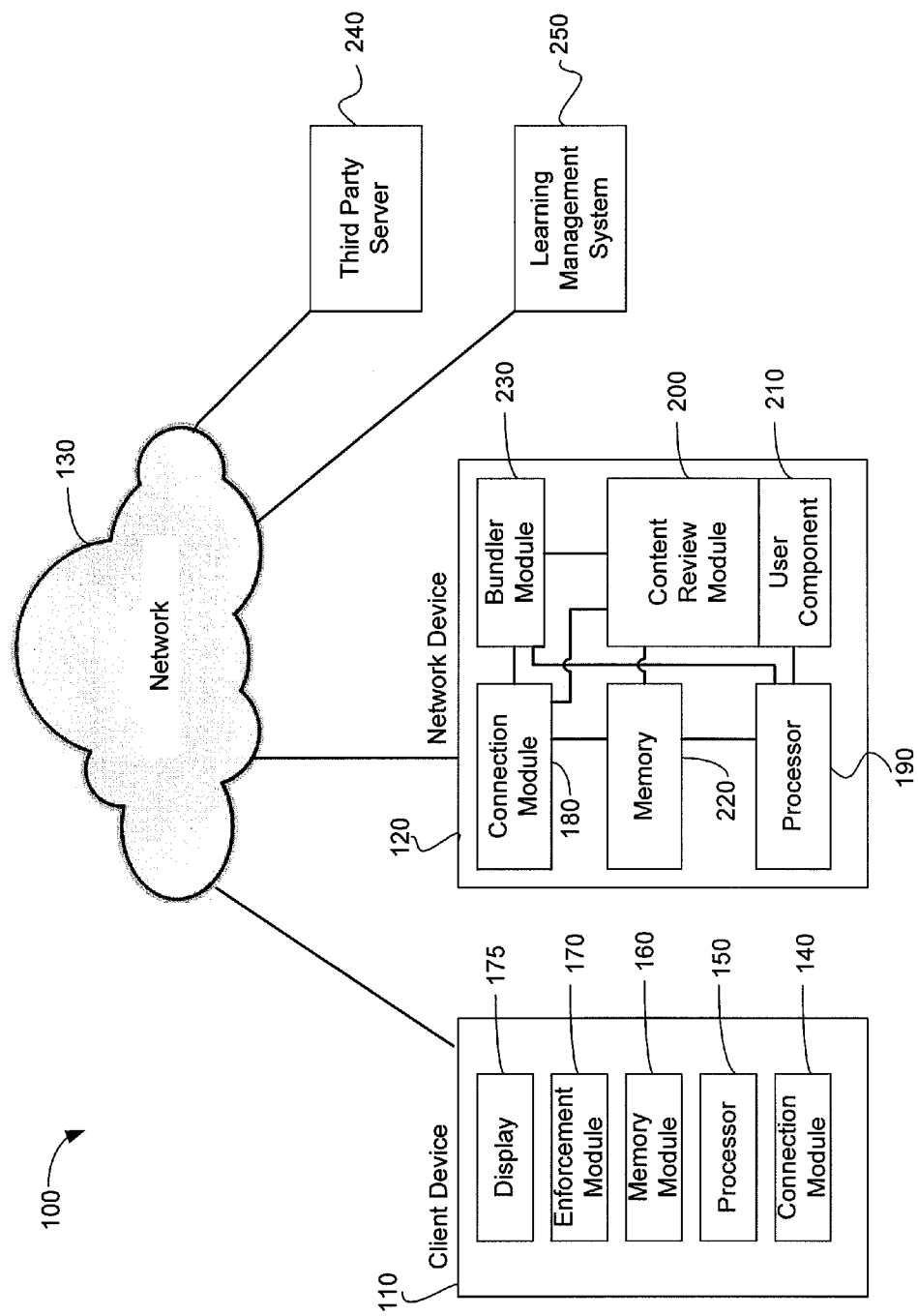
FIG. 1 illustrates a system for digital rights management enforcement according to an example embodiment.

FIG. 1 illustrates a system 100 for digital rights management enforcement according to an example embodiment. Referring to FIG. 1, the system may include at least one client device 110, a network device 120, a network 130, a third party server 240 and a learning management system 250.

At least one client device 110 accesses the network device 120 via the network 130. The client device 110 may be, for example, an electronic book, an electronic reader, a tablet computer, a smart phone, a laptop, a handheld gaming console, or the like. The network device 120 may be a separate computing device configured to transmit and receive data related to one or more services or applications that run on one or more client devices 110. The network device 120 may be a stand-alone device or an arrangement of two or more devices working in conjunction with each other. The network 130 may be the Internet, a Local Area Network (LAN), a Wide Area Network (WAN), a Personal Area Network (PAN), an enterprise network, a Virtual Private Network (VPN), or the like.

The client device 110 includes a connection module 140 configured to send data to and receive data from the network 130. The client device 110 further includes a processing module 150 configured to execute instructions received from the system 100 and a memory module 160 (e.g., database for storing, for example, digital content, DRM, or the like), and a display 175. The client device 110 also includes an enforcement module 170 configured to retrieve the DRM related to digital content and enforce the DRM with respect to the digital content.

When a user requests digital content, (e.g., an electronic book, a game, a video, an image, an audio recording, or the like), the client device 110 transmits the request via the connection module 140 to the network device 120.

The network device 120 may include a connection module 180, a processor 190, a content review module 200, a user component 210, a memory module 220, and a bundler module 230.

The connection module 180 of the network device 120 receives the request and may transmit the request for digital content (e.g., from the client device) to the processor 190 for processing. The content review module 200 is configured to retrieve the digital content requested by the user. The content review module 200 is further configured to associate the DRM with the requested digital content. In some cases, the DRM may be stored in the memory module 220.

The memory module 220 may be a database within the network device 120, and may be operatively connected to the content review module 200 or may be a component within the content review module 200. In some cases, the memory module 220 may be a separate database operatively connected to the network device 120.

The content review module 200 may include a user component 210 that determines the DRM based on user data, for example, user identification, user role, user intended use of the digital content, and the like, received from the client device 110. Depending on the user data, the DRM may be modified, for example a user identified as an author of the digital content may be able to further edit the digital content. In some cases, the user may be identified as a student and the student may have access to the digital content during a school year but the DRM may limit the time the student has access to the digital content and may further limit the student's rights to edit or annotate the digital content.

The content review module 200 may retrieve additional DRM requirements by querying external devices connected to the network 130. For example, the network device 120 may query a third party server 240 to retrieve additional DRM that may be associated with the requested digital content. In some cases, the third party server 240 may be a publication server and may store DRM in relation to digital content. In some cases, the network device 120 may further query a learning management system 250. As an example, the learning management system 250 may be associated with an educational institution (or other organization offering on-line learning to individuals or users associated therewith). The learning management system 250 may determine specific DRM associated with the requested digital content based on the user data. For example, if the user's role is "student" the DRM associated with the requested digital content may include annotation rights. As another example, if the user's role is "professor" the DRM associated with the requested digital content may include editing rights. It will be understood that the DRM associated with the requested digital content may be different based on the requested digital content, the use of the content and the user data retrieved by the system 100.

As discussed above, the network device 120 includes a bundler module 230. The bundler module 230 receives the requested digital content and the associated DRM and bundles the data (e.g. the requested digital content and the associated DRM) to send to the client device 110. The bundler module 230 is intended to ensure that the DRM are bundled with the requested digital content in a form such that the enforcement module 170 of the client device 110 is able to enforce the DRM. It is intended that the DRM are enforceable by the enforcement module 170 without the need to further query the network device 120 or other external device once the requested digital content (e.g., the bundled data) has been transmitted to the client device 110. In some cases, the bundler module 230 reviews the DRM to determine whether the specification of the DRM meets DRM standards. In some cases, the bundler module 230 may format or otherwise amend the DRM to meet DRM standards. In other cases, the content review module 200 or the client device enforcement module 170 may format the DRM to meet DRM standards FIG. 2 is a flowchart illustrating a method 300 for digital right management enforcement according to one example embodiment.

Figure 2:
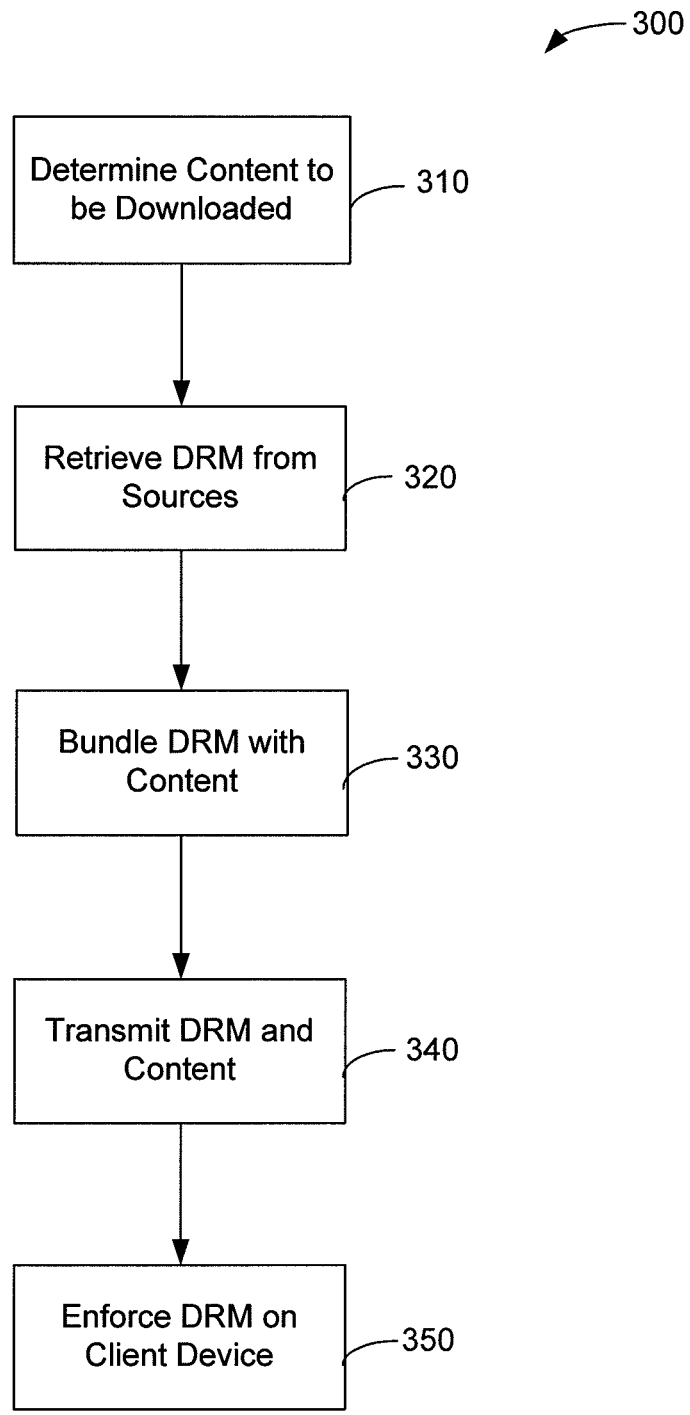
FIG. 2 is a flowchart illustrating a method for digital rights management enforcement according to an example embodiment.

Referring to FIG. 2, at 310 the system 100 determines the requested digital content to be downloaded to a client device 110.

At 320, the content review module 200 retrieves the DRM to be associated with the digital content. The content review module 200 may retrieve the DRM stored locally in a memory module 220 and may retrieve further DRM stored externally and associated with the requested digital content or associated with the user data related to the user requesting the digital content.

At 330, the bundler module 230 bundles the DRM with the requested digital content.

At 340, the bundled DRM and requested digital content are transmitted to the client device 110. The client device 110 receives the bundled DRM and digital content. In some cases, the client device 110 may unbundle the DRM and associated digital content and store both the requested digital content and the DRM in the memory module 160.

At 350, the enforcement module 170 enforces the DRM on the client device 110. As the DRM are bundled with the requested digital content and transmitted to the client device 110, the client device does not require further network connectivity in order for the DRM to be enforced. The DRM bundled with the requested digital content are intended to take into account user data that may further modify the DRM associated with particular digital content.

Figure 3:
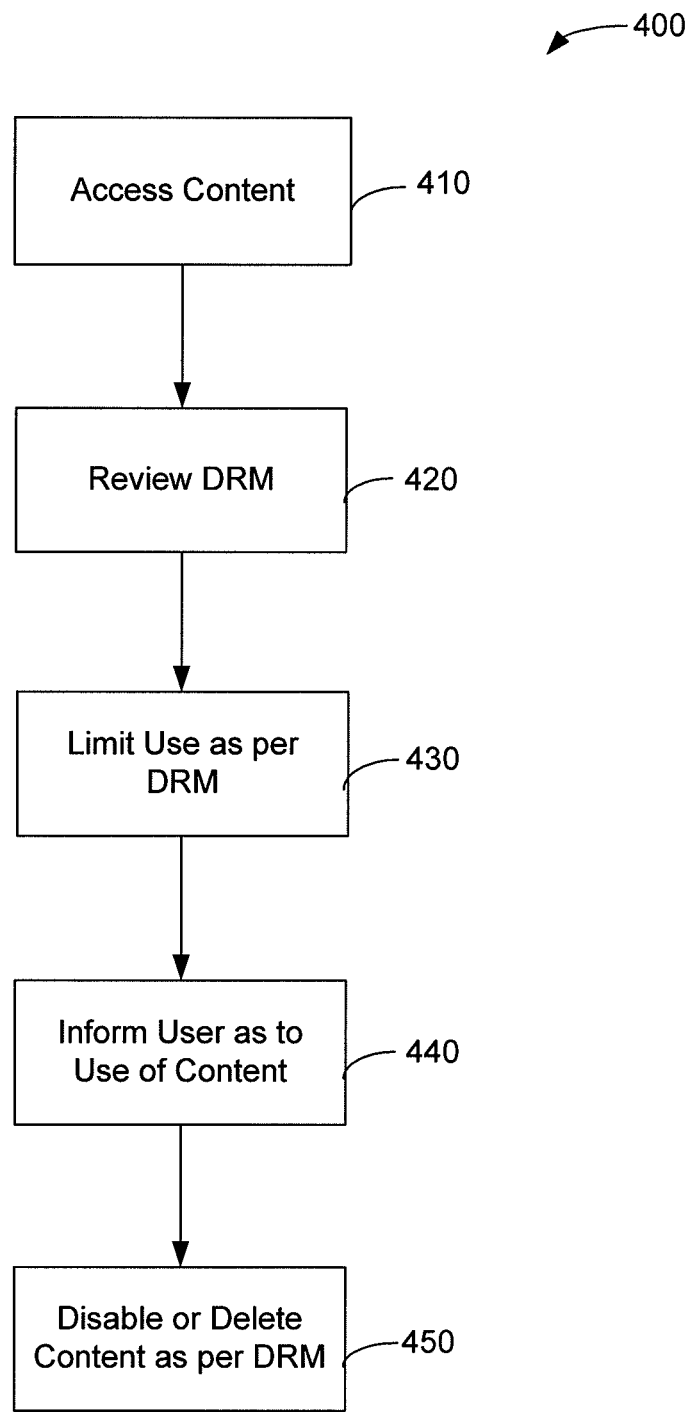
FIG. 3 is a flowchart illustrating a method of client side enforcement according to an example embodiment.

FIG. 3 is a flow chart illustrating a method 400 of client side enforcement for DRM according to an example embodiment.

Referring to FIG. 3, at 410, the user accesses the content.

At 420, when the user accesses the digital content on the client device, the enforcement module 170 reviews the DRM associated with the digital content. In some cases, the enforcement module 170 may query the memory module 160 to determine the associated DRM.

At 430, the enforcement module 170 limits the user's use of the digital content in relation to the associated DRM.

At 440, the enforcement module 170 may inform the user as to the DRM associated with the content and the use allowed with respect to the content. In some cases, the allowed uses or limited uses may be displayed to the user via the display 175. In other cases, the user may be informed that a use is not permitted via, for example, an error message, an audible warning or the like. In still other cases, certain menu items that are restricted may be greyed out to the user or otherwise displayed emphatically (e.g., in relation to other non-restricted items).

At 450, the enforcement module 170 may disable or delete the digital content if the system 100 determines from the associated DRM that the content has expired for the user. In some cases, prior to disabling or deleting the digital content, the system may ask the user whether the user wishes to renew access to the digital content. In some cases, it may be preferable to simply disable the digital content, for example if it seems likely the user will want to renew access to the digital content. Disabling instead of deleting the digital content may allow the user to more quickly renew access. In other cases, the system 100 may delete the digital content. For example, in an education system the user may be given access to specific digital content with limited rights when writing an assignment or test and it may be preferable to delete the digital content on completion of the user's task.

The system 100 and associated methods are intended to ensure that the DRM associated with user requested digital content is enforced, even if the user reduces or limits the network connectivity of the client device 110. By bundling the DRM with the associated digital content and transmitting the DRM with the digital content, the system 100 is intended to enforce the DRM locally on the client device.

In some cases, the system 100 may be used in an educational institution. The user may request digital content and the network device 120 may query associated DRM via the learning management system 250 and other external devices (e.g., third party server 240). In some cases, the learning management system 250 may augment the associated DRM. For example, the learning management system 250 may limit the printing, sending, sharing, annotating or copying of the material (e.g., digital content). For example, the digital content may include an associated DRM that limits the copying of the digital content to 10% of the overall digital content and the learning management system may 250 may augment the associated DRM to restrict copying to 5%, to only allowing annotating of the digital content, or the like.

In another example, the digital content may include an associated DRM that only allows sharing annotations of the digital content to users registered in the same course or having the same instructor. The learning management system 250 may be queried to determine the appropriate associated DRM for each user which is intended to ensure that the associated DRM bundled with the digital content are restricted in the desired manner.

In yet another example, the DRM may specify an expiry date that may be tied to a course date and the system 100 may retrieve this date by querying the course schedule stored in the learning management system 250. Once the system 100 determines the course date, the system 100 may bundle the modified DRM with the course date such that the DRM associated with the digital content are further associated with the course schedule.

Figure 4:
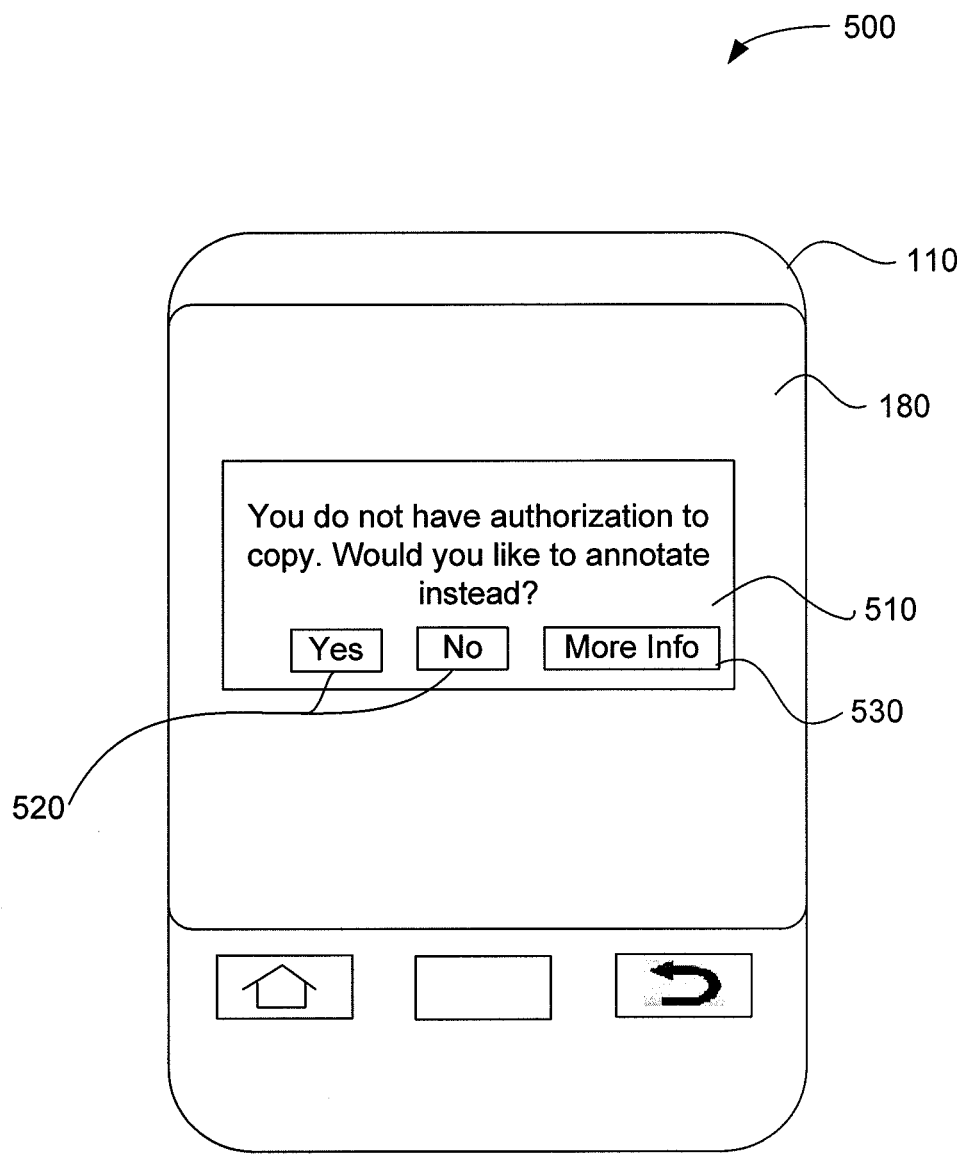
FIG. 4 illustrates an example of a user display of a client device using a system for digital rights management enforcement according to an example embodiment.

FIG. 4 illustrates an example 500 of a user display 175 of a client device 110 using a system 100 for digital rights management enforcement according to an example embodiment.

Referring to FIG. 4, the user has previously requested digital content and the client device 110 has stored the digital content and associated DRM. The user may have limited rights to the digital content and the enforcement module 170 may retrieve and enforce the DRM locally. In this example, the user may attempt to copy a particular passage of the digital content. If the user does not have the access to copy the digital content (e.g., the particular passage of the digital content, a percentage of the digital content exceeding a predefined threshold, or the like), when the user attempts to copy the digital content, the enforcement module 170 will notify the user that this operation (e.g., the copying of the digital content) is not permitted. In some cases, as shown, the user may be given a message 510 stating the limited right, not having the authorization to copy.

The user may further be given an option with a right for which the user has authorization, the user may select to annotate the particular passage of the digital content as oppose to copying the particular passage of the digital content. In some cases, the user display 180 may include buttons 520 with which the user can agree to perform the other operation or the user can cancel the operation. The user may be given a further button 530 or other input option with which the user can request more information about the DRM associated with the content. In some cases, when requesting more information the user may also be given the option to enhance the associated DRM, if such an option exists. For example, by paying a fee the user may be given further options to edit or copy aspects of the digital content.

It is intended that the system 100 is configured to review the associated user data with the client device 110 request for data. The system 100 may enforce membership based DRM in that only users having a certain membership to a class, group or school have access to the content, or users with different memberships may have different DRM bundled with the requested digital content. In some cases, the user may be requested to log into the system 100, and on login to the system 100 may retrieve previously stored user data related to the user, or use the user identification to retrieve user data from external devices (e.g., the learning management system 250). In other cases, the client device 110 may have identification associated with a user (e.g., an IP addresses, MAC address, or the like that may be associated with a specific user or a group membership of a user). In still other cases, the user may be requested to enter user data on requesting digital content.

It is intended that the enforcement of the DRM remains autonomous after the bundled digital content and DRM are stored locally on the client device 110. In some cases, the user may wish to update the digital content and associated DRM. For example, if the user changes courses, then the user may wish to update the associated DRM if the courses end on a different date and the digital content is set to expire on the course end date (e.g., so as to extend the appropriate digital rights corresponding to the digital content to the updated course end date). In some cases, on a change of user data, the system 100 may automatically update the DRM associated with the digital content for the user.

In some cases, the system 100 may receive input with respect to the DRM from an administrator. For example, an instructor may update specific DRM associated with digital content for an assignment. The instructor may wish to limit the sharing of the digital content such that only group members may share digital content with each other. When a student requests the data, the system 100 bundles these additional DRM requirements with any other associated DRM prior to transmitting the digital content to the student. If the instructor assigns a group case study, the system 100 retrieves any DRM associated with the case study and bundles any additional DRM initiated by an instructor. The enforcement module 170 retrieves the DRM and enforces the rights at the client device 110.

In some cases, the DRM associated with the digital content may be annotation rights. A user may be able to annotate the digital content. For example, the user may be able to add a caption to an image or video, highlight text in a book, add a note to text in a book, or the like. In some cases the annotation rights may be restricted such that a user may annotate but not share the annotations or only be allowed to share the annotations within certain users or group members.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a non-transitory machine-readable medium (also referred to as a non-transitory computer-readable medium, a non-transitory processor-readable medium, or a non-transitory computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The non-transitory machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the non-transitory machine-readable medium. The instructions stored on the non-transitory machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for enforcing Digital Right Management (DRM) using a client device, the method comprising:
  receiving, over a network, a user request for digital content;

retrieving DRM data associated with the requested digital content, wherein the retrieving of the DRM data associated with the requested digital content comprises:
  querying a learning management system for information relating to a role of the user in relation to the learning management system, and
  where the role of the user receiving the digital content is that of a learner, receiving an update to DRM data associated with the digital content from another user that is associated with the learning management system and has a role as an instructor;
  updating the DRM data associated with the digital content based on the received update to provide new associated DRM data;
bundling the associated DRM data with the requested digital content;
transmitting the bundled DRM data and digital content to the client device; and
enforcing the DRM on the client device, wherein enforcing the DRM comprises:
  receiving a requested user right associated with the digital content from a user via a user input device connected with the client device;
  determining whether the requested user right is allowable based on the DRM data, and
  if the requested user right is allowable, performing the user right, otherwise informing the user of the DRM data associated with the requested digital content, wherein informing the user comprises:
    determining available user rights associated with the digital content;
    displaying a listing of available user rights associated with the digital content by a display module of the client device; and
    receiving a user request for an available user right from the user via the user input device.

2. The method of claim 1, further comprising:
storing the requested digital content and DRM on the client device;
accessing the digital content on the client device;
retrieving the associated DRM stored locally on the client device; and
limiting use of the digital content as restricted by the DRM.

3. The method of claim 1, further comprising disabling access to the requested digital content as defined in the associated DRM data.

4. The method of claim 1, further comprising deleting the requested digital content as defined in the associated DRM data.

5. The method of claim 1, wherein the determining of the client requested digital content further includes determining user data related to the user requesting the digital content.

6. The method of claim 5, wherein the retrieving of the DRM data includes retrieving DRM data related to the user data.

7. The method of claim 5, wherein the user data includes at least one of user identification data, user membership data, user role, and user's intended use of the data.

8. The method of claim 1, wherein the determining of whether the client device has the appropriate rights for performing the requested operation in relation to the digital content is performed using information stored locally on the client device.

9. The method of claim 8, wherein the determining of whether the client device has the appropriate rights for performing the requested operation in relation to the content is performed without requiring further information relating to digital rights associated with the content to be transmitted to the client device.

10. The method of claim 1 wherein the user rights are selected from a group comprising: accessing, copying, annotating, printing, modifying, and transmitting.

11. The method of claim 1, wherein the user rights associated with the digital content include the rights associated with sharing information associated with the digital content among one or more other users belonging to a group of users of the learning management system to which the user belongs.

12. A system for enforcing Digital Right Management (DRM) on a client device, the system comprising:
  a learning management system configured to provide on-line learning to a plurality of users respectively associated with the learning management system, the learning management system storing information relating to roles of the plurality of users;
  the client device configured to issue a request, over a network, for digital content from a user;
  a content review module configured to retrieve DRM data associated with the requested digital content, wherein retrieval of the DRM data associated with the requested digital content comprises:
    querying the learning management system for information relating to a role of the user in relation to the learning management system; and
    where the role of the user receiving the digital content is that of a learner,
    receiving an update to DRM data associated with the digital content from another user that is associated with the learning management system and has a role as an instructor;
    updating the DRM data associated with the digital content based on the received update to provide new associated DRM data;
  a bundler module configured to bundle the associated DRM data with the requested digital content;
  a connection module configured to transmit the bundled DRM data and digital content to the client device; and
  an enforcement module configured to enforce the DRM on the client device,
  wherein the enforcement module is further configured to:
    receive a requested user right associated with the digital content from a user via a user input device connected with the client device;
    determine whether the requested user right is allowable based on the DRM data, and
    if the requested user right is allowable, perform the requested user right,
    otherwise inform the user of the DRM data associated with the requested digital content, wherein informing the user comprises:
    determining available user rights associated with the digital content;
    displaying a listing of available user rights associated with the digital content by a display module of the client device; and
    receiving a user request for an available user right from the user via the user input device.

13. The system of claim 12, further comprising:
a memory module configured to store the requested digital content and DRM data on the client device.

14. The system of claim 12, wherein the content review module is further configured to determine user data related to the user requesting the digital content.

15. The system of claim 14, wherein the content review module is further configured to retrieve DRM data related to the user data.

16. The system of claim 15, wherein the user data includes at least one of user identification data, user membership data, user role, and user's intended use of the data.

17. The system of claim 12, wherein the enforcement module is further configured to determine whether the client device has the appropriate rights for performing the requested operation in relation to the digital content using information stored locally on the client device.

18. The system of claim 17, wherein the enforcement module is further configured to determine whether the client device has the appropriate rights for performing the requested operation in relation to the content without requiring further information relating to digital rights associated with the content to be transmitted to the client device.

19. The system of claim 12 wherein the enforcement module is further configured to provide a notification to the user if the received user right is not allowable based on the DRM data.

\* \* \* \* \*